United States Patent
Zhang et al.

(10) Patent No.: US 10,068,018 B2
(45) Date of Patent: Sep. 4, 2018

(54) SYSTEM AND METHOD FOR DETERMINING WHETHER A PRODUCT IMAGE INCLUDES A LOGO PATTERN

(71) Applicant: Alibaba Group Holding Limited, Grand Cayman (KY)

(72) Inventors: Zengming Zhang, Hangzhou (CN); Depin Chen, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 15/259,081

(22) Filed: Sep. 8, 2016

(65) Prior Publication Data

US 2017/0069077 A1    Mar. 9, 2017

(30) Foreign Application Priority Data

Sep. 9, 2015 (CN) .......................... 2015 1 0570605

(51) Int. Cl.
G06K 9/00 (2006.01)
G06F 17/30 (2006.01)
G06K 9/52 (2006.01)
G06K 9/62 (2006.01)
G06K 9/46 (2006.01)

(52) U.S. Cl.
CPC ..... *G06F 17/30864* (2013.01); *G06K 9/4671* (2013.01); *G06K 9/52* (2013.01); *G06K 9/6201* (2013.01); *G06K 2009/4666* (2013.01); *G06K 2209/25* (2013.01)

(58) Field of Classification Search
None
See application file for complete search history.

(56) References Cited

U.S. PATENT DOCUMENTS

| 6,289,341 | B1 | 9/2001 | Barney |
| 7,127,405 | B1 | 10/2006 | Frank et al. |
| 7,804,982 | B2 | 9/2010 | Howard et al. |
| 7,925,044 | B2 | 4/2011 | Metois et al. |
| 8,332,419 | B1 * | 12/2012 | Dhua ............... G06F 17/30542 707/758 |

(Continued)

OTHER PUBLICATIONS

Sahbi et al., "Context-dependent logo matching and recognition", IEEE Transactions on Image Processing, vol. 22, No. 3, Mar. 2013.*

(Continued)

*Primary Examiner* — Soo Park
(74) *Attorney, Agent, or Firm* — James J. DeCarlo; Greenberg Traurig, LLP

(57) ABSTRACT

The present invention provides a method and device for detecting the presence of logo patterns in product images. The method comprises the steps of retrieving one or more logo patterns from a logo pattern library, each of the one or more logo patterns identifying a respective product brand; retrieving a product image; calculating for each of the one or more logo patterns, a matching degree, the matching degree representing a degree to which each logo pattern is present in the product image; selecting as a selected logo pattern, the logo pattern having the greatest calculated matching degree; and determining that the product image includes the selected logo pattern if the matching degree of the selected logo pattern is greater than a first threshold.

14 Claims, 7 Drawing Sheets

(56) References Cited

U.S. PATENT DOCUMENTS

| | | | |
|---|---|---|---|
| 8,667,609 B2 | 3/2014 | Tan et al. | |
| 8,673,137 B2 | 3/2014 | Verdegan et al. | |
| 9,042,659 B2* | 5/2015 | Adamek | G06K 9/42 |
| | | | 382/201 |
| 9,697,234 B1* | 7/2017 | Dhua | G06F 17/30253 |
| 2003/0061490 A1 | 3/2003 | Abajian | |
| 2006/0251292 A1 | 11/2006 | Gokturk et al. | |
| 2007/0133947 A1 | 6/2007 | Armitage et al. | |
| 2007/0199988 A1 | 8/2007 | Labgold et al. | |
| 2008/0008348 A1 | 1/2008 | Metois et al. | |
| 2011/0066648 A1 | 3/2011 | Abhyanker et al. | |
| 2012/0144499 A1 | 6/2012 | Tan et al. | |
| 2013/0202213 A1* | 8/2013 | Adamek | G06K 9/42 |
| | | | 382/201 |
| 2013/0275427 A1 | 10/2013 | Tan et al. | |
| 2014/0133763 A1 | 5/2014 | van Zwol et al. | |
| 2014/0144819 A1 | 5/2014 | Verdegan et al. | |
| 2014/0372316 A1 | 12/2014 | Tan et al. | |
| 2015/0051970 A1 | 2/2015 | Stafford, Jr. et al. | |
| 2015/0347801 A1* | 12/2015 | Svetal | G06K 7/1447 |
| | | | 235/454 |
| 2016/0012304 A1* | 1/2016 | Mayle | G06K 9/46 |
| | | | 382/209 |
| 2016/0180545 A1* | 6/2016 | Le Clerc | G06K 9/00771 |
| | | | 382/103 |

OTHER PUBLICATIONS

International Search Report and Written Opinion to corresponding International Application No. PCT/2016/050851 dated Dec. 1, 2016 (11 pages).

International Preliminary Report on Patentability to corresponding International Application No. PCT/US2016/050851 dated Mar. 22, 2018 (12 pages).

* cited by examiner

SYSTEM AND METHOD FOR DETERMINING WHETHER A PRODUCT IMAGE INCLUDES A LOGO PATTERN

CROSS-REFERENCE TO RELATED APPLICATIONS

This application claims the benefit of priority from Chinese Patent Application No. 201510570605.9, filed on Sep. 9, 2015, entitled "Method and Apparatus for Detecting Potential Infringing Product Image," which is incorporated herein by reference in its entirety.

BACKGROUND

Field of the Disclosure

The present disclosure relates to a system and method for determining whether a product image includes a logo pattern.

Description of Related Art

Many e-commerce platforms experience issues relating to the infringement of intellectual property caused by products present on the platforms, such as complaints of trademark infringement by intellectual properties holders. In the context of international e-commerce platforms, these infringement issues have significantly, and negatively, impacted the platforms in various ways (e.g., requiring compensation in connection infringement judgments) and have exposed such platforms to serious legal risks. Thus, effectively identifying and reducing the number of infringing products and product images on these platforms has become a problem that urgently must be solved. Furthermore, solving this problem also enhances the international image of e-commerce platforms and creates a positive shopping environment for users.

Current methods used by e-commerce platforms identify potentially infringing images using known detection methods and then send these images to a manual auditing system. At a manual auditing system, an auditing staff conducts a final review to determine whether the images are, in fact, infringing and determine the accuracy of the detection results. These existing platforms often employ one, or both, of the following methods to detect suspected infringing products.

In the first method a rule-based detection method is used which detects whether product data (e.g., title or attributes) contains keywords based on a pre-configured textual rule. If the product data matches the keywords, the method determines that the product potentially infringes a known brand.

A second method matches similarities of product images to pre-collected product images. In this method, a product image is matched with multiple pre-collected product images based on similarities between the images. By matching the similarities between images, the second method can determine whether the product image is similar to the pre-collected product images when the degree similarity meets or exceeds a preset threshold.

In practice, exhaustive rules for the first method cannot be pre-configured, thus the detection is incomprehensive. Additionally, sellers often revise product titles or attribute information in order to avoid detection by the first method, thus leading to poor detection results and limited recall rates. Similarly, the second method is not sufficiently robust. For example, the same product may vary a great deal in images shot from different angles, leading to discrepancies in terms of matching the similarity of the image to pre-collected images. Therefore, sellers may use different shooting angles to avoid being recalled. Furthermore, due to the limited accuracy of similarity matching, a large number of suspected infringing product images may be detected, which results in excessive image recall, and places significant pressure on the auditing staff during the manual auditing process.

BRIEF SUMMARY

In response to the deficiencies identified above, the disclosure describes a detection system and method for determining whether a product image includes a logo pattern that improves both detection robustness and accuracy and controls the amount of imagery recalled.

In one aspect, the present disclosure describes a method for determining whether a product image includes a logo pattern. In one embodiment the method includes retrieving one or more logo patterns from a logo pattern library, each of the one or more logo patterns identifying a respective product brand; retrieving a product image; calculating for each of the one or more logo patterns, a matching degree, the matching degree representing a degree to which each logo pattern is present in the product image; selecting as a selected logo pattern, the logo pattern having the greatest calculated matching degree; and determining that the product image includes the selected logo pattern if the matching degree of the selected logo pattern is greater than a first threshold.

In another aspect, the present disclosure describes a device for determining whether a product image includes a logo pattern. In one embodiment, the device comprises an acquisition unit for retrieving a product image and one or more logo patterns from a logo pattern library, each of the one or more logo patterns identifying a respective product brand; a first calculation unit for calculating, for each of the one or more logo patterns, a matching degree, the matching degree representing a degree to which each logo pattern is present in the product image; a selection unit for selecting, as a selected logo pattern, the logo pattern having the greatest calculated matching degree; and a detection unit for determining that the product image includes the selected logo pattern if the matching degree of the selected logo pattern is greater than a first threshold.

In another aspect, the present disclosure describes a non-transitory computer-readable storage medium tangibly encoded with computer-executable instructions, that when executed by a processor, perform a method for determining whether a product image includes a logo pattern. In one embodiment the method comprises retrieving one or more logo patterns from a logo pattern library, each of the one or more logo patterns identifying a respective product brand; retrieving a product image; calculating for each of the one or more logo patterns, a matching degree, the matching degree representing a degree to which each logo pattern is present in the product image; selecting as a selected logo pattern, the logo pattern having the greatest calculated matching degree; and determining that the product image includes the selected logo pattern if the matching degree of the selected logo pattern is greater than a first threshold.

Unlike the related art, the embodiments of the present disclosure are not based on text-based rules or analyzing an entire product image. Rather, the disclosed embodiments utilize a new detection device and method that determines whether a product image includes a logo pattern. Since the logo is a brand mark shown on a product, sellers often highlight the logo on product images to attract buyers.

Variations in the shooting angle and illumination in product images often have little impact on the logo. Thus, many product images with a logo can be detected using the logo pattern. Therefore, product image matching based on the logo pattern is more robust and has a higher successful recall rate.

The degree in which a logo pattern matches a suspect product image indicates the probability that the suspect product image contains the logo pattern. That is, a greater matching degree means that the product image is more likely to includes a known logo and thus be a suspected infringing product image. Using the features of logo patterns described herein, the accuracy of the detection system and method is relatively high, and does not result in a large blind recall of product images, thus effectively controlling the recall amount and reducing manual review cost.

BRIEF DESCRIPTION OF DRAWINGS

The accompanying drawings described herein are intended, when taken together with the following detailed description, to provide further understanding of the present disclosure. The embodiments of the present disclosure and the description thereof are intended for further explaining and clarifying the present disclosure; the scope of the present disclosure is not defined by the description or the accompanying drawings of any specific embodiments, but rather by the claims. The present disclosure includes the following accompanying drawings.

DETAILED DESCRIPTION

Figure 1:
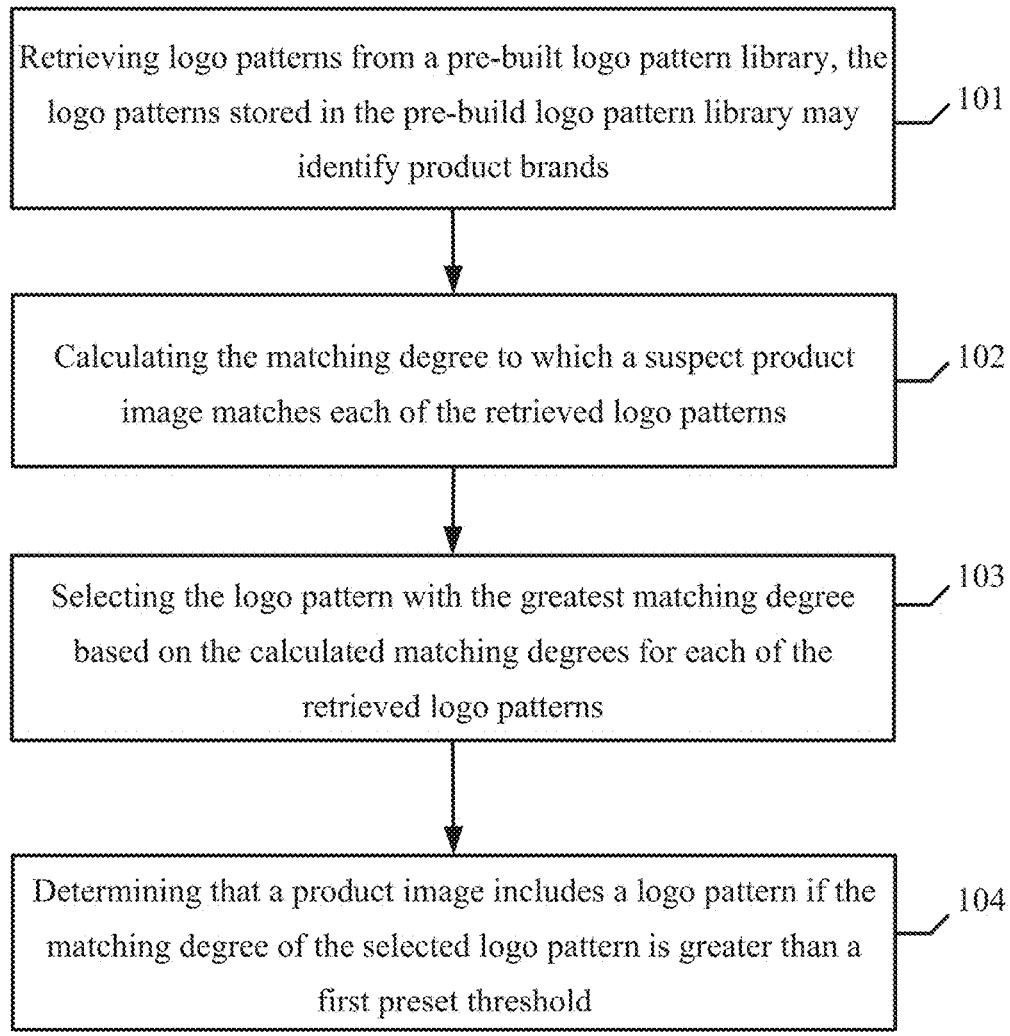
FIG. 1 is a flow chart illustrating a method for determining whether a product image includes a logo pattern according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function to a special purpose, a special purpose computer, ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

FIG. 1 is a flow chart illustrating a method for determining whether a product image includes a logo pattern according to some embodiments of the present disclosure.

In step 101, the method retrieves logo patterns from a pre-built logo pattern library. In one embodiment, the logo patterns stored in the pre-build logo pattern library may identify product brands.

A logo, as used herein, refers to either a symbol, trade dress, or design that identifies a brand or characteristics of a product or service. Logos generally comprise characters, graphs, letters, figures, combinations of three-dimensional marks and colors, shapes, or a combination of all such elements. In one embodiment, a pre-built logo pattern library is built by storing a plurality of logo patterns in the logo pattern library, wherein each logo pattern identifies a known brand. When pre-building the logo pattern library, logo patterns can be captured from the infringing product images, from legal product images, or from an officially issued logo pattern of the brand, or using any combination of these. These logo patterns may be stored in a database to generate the logo pattern library, although alternative storage techniques and devices may be used. In some embodiments, logo patterns can be classified according to one or more product categories to provide a category-based logo pattern library, as discussed further herein.

Logo patterns may be retrieved from the pre-built logo pattern library and used in subsequent calculation processes (e.g., to match a product image with each logo pattern by ergodic means, ensuring a comprehensive match and improving reliability). In active use, the amount of data stored in the logo pattern library may grow significantly large as the library grows. Consequently, processing time and resource utilization is also significantly large when all logo patterns in the logo pattern library are used in subsequent calculations. Therefore, in some embodiments, retrieving logo patterns from a pre-built logo pattern library may include retrieving logo patterns associated with one or more categories, the one or more categories based on one or more categories associated with the product to be identified. In this manner, the method may select a subset of all logo patterns, specifically those logos in an identified category.

In some embodiments, categorization of products is normally carried out on the e-commerce platform (either by the e-commerce platform or itself, or via users of the e-commerce platform) and a logo may be used to identify product brands. In these embodiments, the logo itself may also belong to one or more categories. For example, Louis Vuitton (LV) may be categorized primarily under the categories of "bags" and "suitcases." Thus, one product may only be attributed to one category, and in general the product cannot have logos of products from other categories. Thus, for one product to be identified, only logo patterns in the category of the product to be identified need to be selected, without the need to calculate the matching degree of logo patterns in other categories with respect to the suspect product image. This greatly reduces the amount of calculation. Moreover, due to the fact that matching between logo patterns from other categories and the product to be identified is not needed, mismatch probability can be reduced, and the accuracy of logo matching can be improved.

In step 102, the method calculates the matching degree to which a suspect product image matches each of the retrieved logo patterns. In some embodiments, the matching degree calculated in step 102 may be calculated according to the method illustrated in FIG. 2.

In step 102a, the method extracts local feature points of one or more logo patterns and local feature points of a suspect product image. In step 102b, the method identifies the local feature points of the suspect product image that satisfy a preset matching degree with local feature points of each of the one or more logo patterns. In step 102c, for each of the one or more logo patterns, the method calculates the ratio of the total number of local feature points that satisfy preset matching conditions to the local feature points of a logo pattern. As discussed above, the calculated ratio for each logo pattern represents the matching degree of a given logo pattern with respect to the suspect product image.

Figure 2:
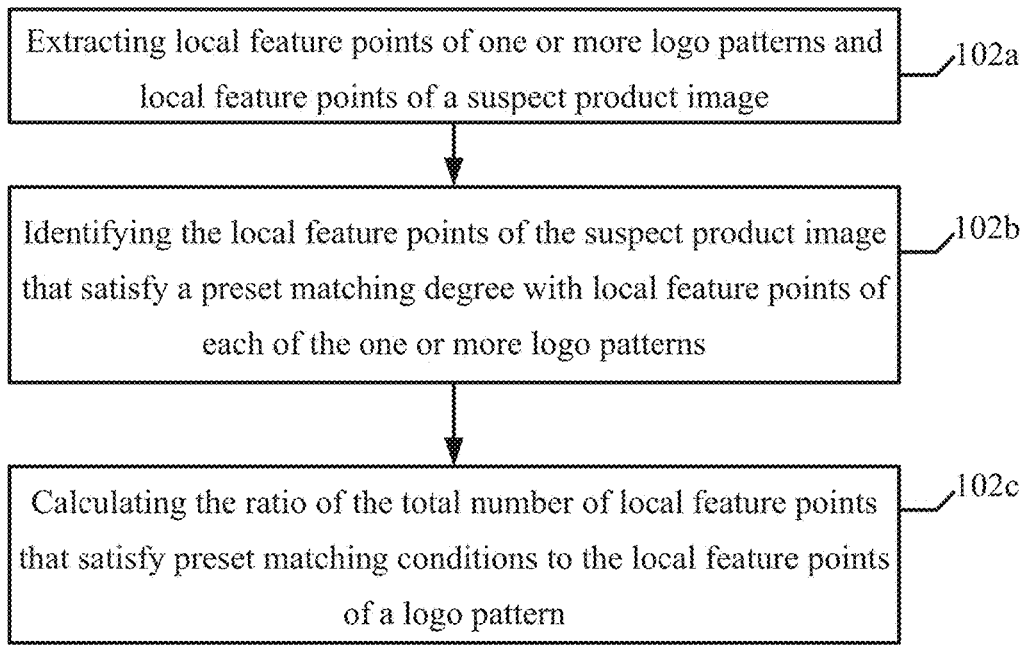
FIG. 2 is a flow chart illustrating method for calculating a matching degree between a product image and one or more logo patterns according to some embodiments of the present disclosure.

The method illustrated in FIG. 2 utilizes local feature matching, which calculates a matching degree by matching feature points between a suspect product image and one or more retrieved logo patterns. In some embodiments, existing local feature matching algorithms may be employed, such as scale invariant feature transform (SIFT), speeded up robust features (SURF), affine SIFT (ASIFT) feature point, and histogram of oriented gradients (HOG). The local feature points are extracted according to the chosen local feature matching algorithm. For example, SIFT feature points are extracted in step 102a when utilizing the SIFT algorithm.

Returning to FIG. 1, in step 103, the method selects the logo pattern with the greatest matching degree based on the calculated matching degrees for each of the retrieved logo patterns.

Finally, in step 104, the method determines that the product image includes a logo pattern if the matching degree of the logo pattern selected in step 103 is greater than a first preset threshold.

The matching degrees obtained from step 102 characterize the probability that the suspect product image contains the one or more logo patterns. As a logo pattern is used to identify a product brand, a seller who infringes upon the brand's intellectual property (e.g., logo pattern) may illegally use the logo pattern of the brand, or imitate the logo of other brands, to generate their own product image in order to attract and confuse users. Therefore, a greater matching degree between a logo pattern and the suspect product image indicates a greater probability that the product image should be identified as a suspected infringing product image. In order to ensure the accuracy of the detection results, the logo pattern with the greatest matching degree is selected in step 103 and then taken as the basis to determine whether the matching degree between the logo pattern and the suspect product image is greater than a first preset threshold. If so, the logo pattern is deemed to be present in the suspect product image. Thus, the method can reliably conclude that the suspect product image may be a suspected infringing product image.

The use of logo patterns in the embodiments described in this disclosure are less affected by the shooting angle and lighting and thus are difficult to thwart or evade by unscrupulous sellers. By using a matching degree between a logo pattern and the suspect product image to detect whether the suspect product image is a suspected infringing product image, the described embodiments are significantly more robust, making detection significantly more comprehensive and accurate than pre-existing techniques. As an added benefit, the amount of recalled imagery (e.g., logo patterns) can be controlled effectively and the cost of manual review is also reduced as compared to pre-existing techniques.

In some embodiments, the suspected infringing product images are sent in real-time, or periodically, to a manual detection system for final review after detection. Reviewers can then confirm whether the suspected infringing product images indeed infringe a logo pattern. If the detection result is considered accurate, the result will be marked accurate; however, if it is considered wrong, the result will be marked as wrong.

In some embodiments, an e-commerce platform detects newly added product images every day. In some embodiments, based on the actual demand, the e-commerce platform may detect product images added in a given time period, such as every hour, every month or every quarter. While the aforementioned embodiments describe the detection of single product images, in other embodiments, multiple product images may be detected in parallel or in series based on the processing capacity and detection period of the e-commerce platform.

Figure 3:
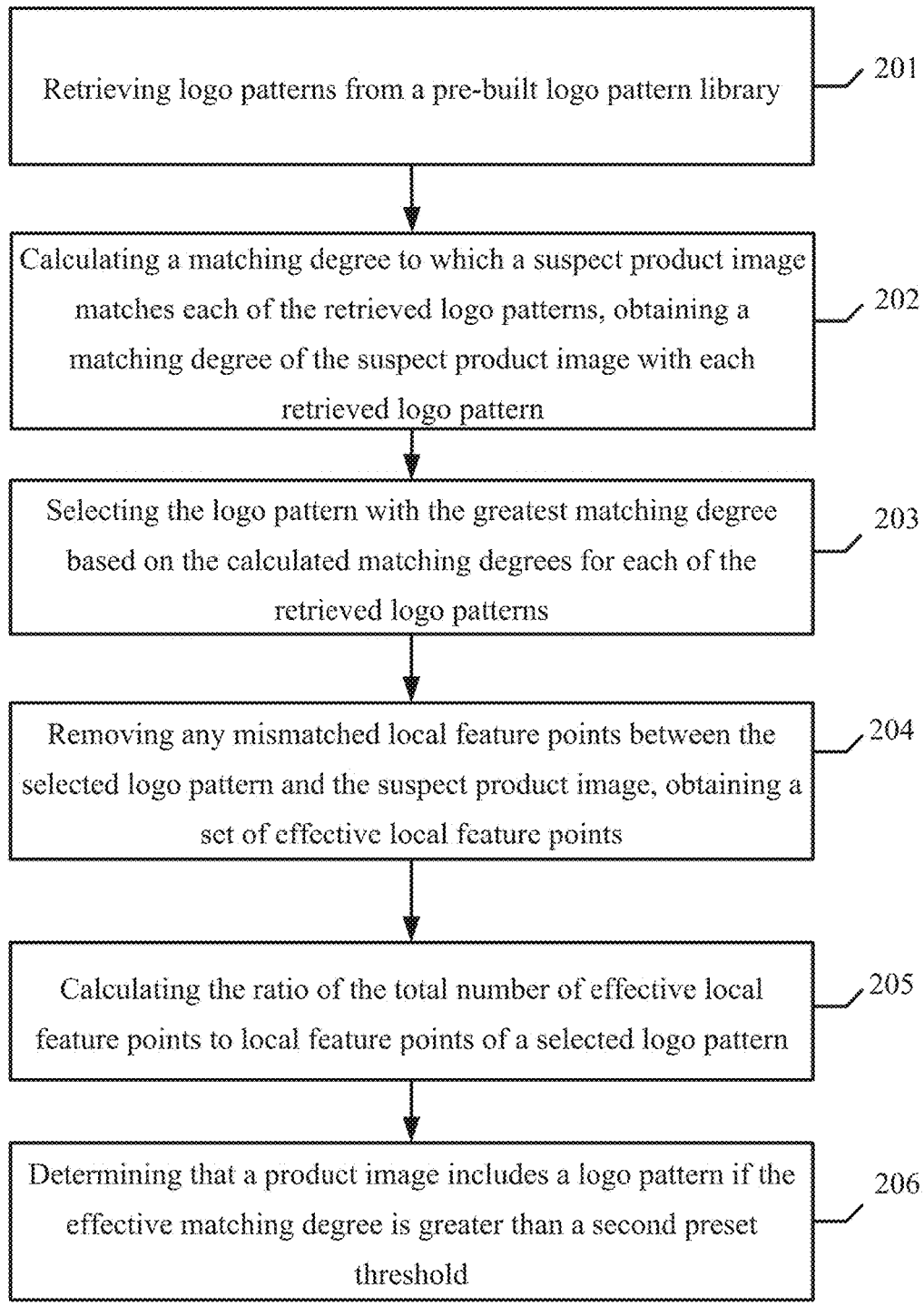
FIG. 3 is a flow chart illustrating a method for determining whether a product image includes a logo pattern according to some embodiments of the present disclosure.

FIG. 3 is a flow chart illustrating a method for determining whether a product image includes a logo pattern according to some embodiments of the present disclosure.

In step 201, the method retrieves logo patterns from a pre-built logo pattern library.

In step 202, the method calculates a matching degree to which a suspect product image matches each of the retrieved logo patterns, thus obtaining a matching degree of the suspect product image with each retrieved logo pattern.

In step 203, the method selects the logo pattern with the greatest matching degree based on the calculated matching degrees for each of the retrieved logo patterns.

The above-mentioned steps 201 through 203 are the same, or substantially similar to steps 101 through 103, discussed with respect to FIG. 1, and the above descriptions can be referred to for the respective steps. Thus, the descriptions of steps 101 through 103 are omitted here for the sake of clarity.

In order to further refine the calculation of a matching degree, the following steps 204 through 205 may be used to calculate the matching degree between a selected logo pattern and a suspect product image. As described herein, steps 204 and 205 may be utilized to further improve the accuracy of matching and detection depending on the time or resources available to an e-commerce platform.

In step 204, the method removes any mismatched local feature points between the selected logo pattern and the suspect product image, thus obtaining a set of effective local feature points. In some embodiments, step 204 may include the method illustrated in FIG. 4.

In step 204a, the method estimates the affine transformation relations between a selected logo pattern and the suspect product image using a random sample consensus algorithm.

In step 204b, the method removes the local feature points not conforming to the affine transformation relations from the local feature points shared between the selected logo pattern and the suspect product image. The method then takes the remaining set of local feature points as the set of effective local feature points.

As affine transformations are linear transformations between two-dimensional coordinates, they maintain the "flatness" (meaning that a straight line will still be a straight line and an arc will still be an arc after transformation) and "parallelism" (meaning that the relative positions between two-dimensional patterns remain unchanged, parallel lines remain parallel, and the positions and orders of points on a straight line remain unchanged) of two dimensional patterns. Affine transformations can be generated by a series of complex atomic transformations, including translating, scaling, overturning, rotating, and shearing. Therefore, the features of affine transformations are used to determine that the logo shape in the suspect product image is unchanged after affine transformation. Based on determining that the logo shape is unchanged, some mismatched local features can be removed.

In step 205, the method calculates the ratio of the total number of effective local feature points to local feature points of a selected logo pattern, the ratio comprising an effective matching degree between the selected logo pattern and the suspect product image.

In step 206, the method determines that a product image includes a logo pattern if the effective matching degree is greater than a second preset threshold.

The effective local feature points obtained from step 203 may be considered to be the actual local feature points of the logo pattern that match the local feature points of the suspect product image. That is, the effective local feature points may remove false positives and represent a more accurate set of local feature points. When the effective matching degree of the logo pattern with respect to the suspect product image is calculated based on effective local feature points, a more accurate effective matching degree is obtained and, as a result, matching is also more accurate.

For example, suppose there are 100 local feature points on the selected logo pattern in the above-mentioned step 202, and the matching degree of the logo pattern with respect to the suspect product image is 80%, meaning there are 80 matched local feature points of the logo pattern on the suspect product image. There may be, however, some mismatches in such 80 local feature points. In order to improve accuracy, the mismatched local feature points may be removed, using the method illustrated in FIG. 3, to obtain 60 effective local feature points. Then, based on these 60 effective local feature points, the effective matching degree of the logo pattern on the suspect product image is effectively 60% after removing mismatches. If the second preset threshold is set at 50%, the condition is satisfied (i.e., 60% matching feature points is greater than the 50% matching feature point threshold). It also indicates that the logo pattern is present on the suspect product image, therefore, suspect the product image can be determined as a suspected infringing image.

Figure 4:
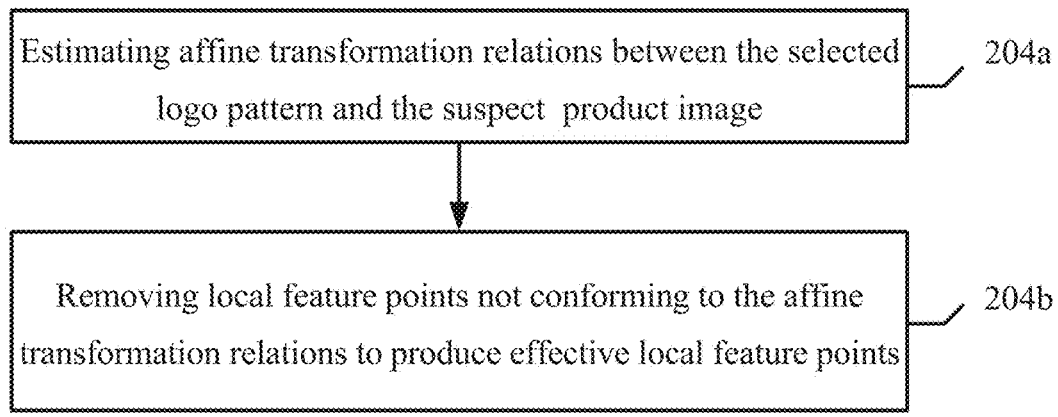
FIG. 4 is a flow chart illustrating a step in a method for determining whether a product image includes a logo pattern according to some embodiments of the present disclosure.

The described embodiments in connection with FIGS. 3 and 4 improve detection and recall accuracy by removing mismatches from the local feature points of the logo pattern that match the local feature points on the suspect product image, thus calculating the effective matching degree for detection on the suspect product image.

The detection methods described above primarily take the logo pattern in the logo pattern library as a reference object. Therefore, the quality of logo patterns in the logo pattern library will directly affect the detection of suspected infringing images. For example, if a logo pattern is clear, uncluttered, and has less text, then the matching accuracy will be higher. But, if the logo pattern is not clear or has more text, mismatching may appear more easily in the matching process. Therefore, in some embodiments the method may further include steps to optimize the logo pattern, so as to enhance the quality of the logo pattern library.

Figure 5:
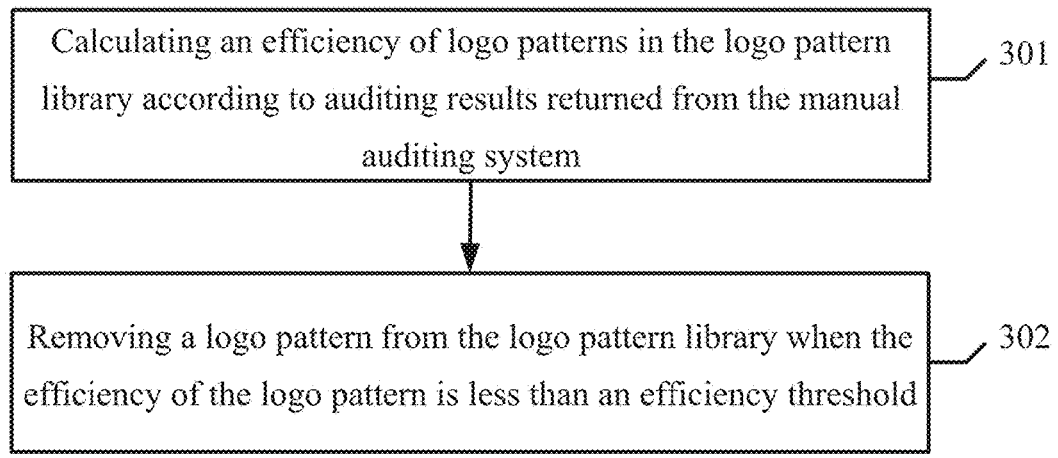
FIG. 5 is a flow chart illustrating a method for optimizing a logo pattern library according to some embodiments of the present disclosure.

FIG. 5 illustrates a method for optimizing a logo pattern library according to some embodiments of the present disclosure. The logo pattern optimization steps may be incorporated into the embodiments described in FIG. 1 or FIG. 3. In some embodiments, the logo pattern optimization steps may be performed concurrently with the suspected infringing product image detection steps.

In step 301, the method calculates an efficiency of logo patterns in the logo pattern library according to the auditing results returned from the manual auditing system. The calculated efficiency may be used to characterize the accuracy of the suspected infringing product image detection based on the logo pattern.

In step 302, the method removes a logo pattern from the logo pattern library when the efficiency of the logo pattern is less than an efficiency threshold.

The method illustrated in FIG. 5 forms a self-learning environment by utilizing a closed-loop review method. As the method calculates the efficiency of logo patterns based on the review results from the manual auditing system, the recall accuracy of logo patterns can be measured by the efficiency of logo patterns. This means that the higher the recall accuracy of the logo pattern is, the greater the reliability and quality of the logo pattern is, in accordance primarily with the rate of actual infringing product images in suspected infringing product images recalled based on the logo pattern.

In some embodiments, step 301 includes calculating statistics on a total number M of suspected infringing product images detected based on one logo pattern according to a preset time period. The method may then calculate statistics on the total number of images N with accurate auditing results among the suspected infringing product images detected for the logo pattern based on auditing results returned from the manual auditing system. The method may then calculate the ratio of the total number N to the total number M, the ratio representing the calculated efficiency of the logo pattern.

For example, in a given time period, if there are 20 suspected infringing product images recalled based on a logo pattern, and only 5 are considered to involve actual infringement through manual auditing, then the efficiency of the logo pattern can be determined as 5:20, or 25%.

As another example, in a given time period, if there are 30 statistical suspected infringing product images recalled based on another logo pattern, and only 20 are considered to involve actual infringement through manual auditing, then the efficiency of the logo pattern can be determined as 20:30, or roughly 67%.

Supposing an efficiency threshold is preset at 60% and the efficiency of a logo pattern is 5:20 (less than 60%), the efficiency of the logo pattern will be deemed as too low (i.e., less than the efficiency threshold). If the efficiency of a logo pattern is determined to be below the efficiency threshold, it may be determined that it is easy to mistakenly recall some suspected infringing product images, causing a burden to manual auditing. In this case, the logo pattern will be removed to enhance the recall accuracy for the next logo matching. Another logo pattern with an efficiency of 20:30 (greater than 60%) will be deemed as exceeding the require efficiency threshold, and the logo pattern will remain in the logo pattern library.

Corresponding to the above-mentioned method, the present disclosure also provides a detection device for suspected infringing product images.

Figure 6:
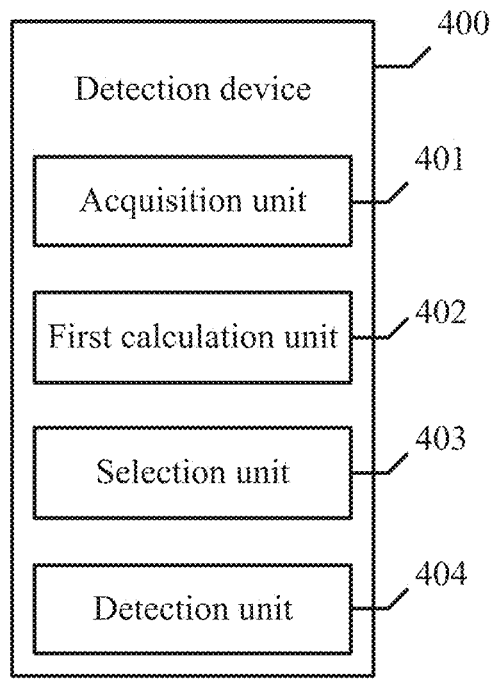
FIG. 6 is a structural diagram of a suspected infringing product image detection device according to some embodiments of the present disclosure.

FIG. 6 is a structural diagram of a suspected infringing product image detection device according to some embodiments of the present disclosure. As shown in FIG. 6, the detection device 400 includes the following units.

Acquisition unit 401 is configured to retrieve logo patterns from a pre-built logo pattern library, wherein the stored logo patterns identify product brands.

First calculation unit 402 is configured to calculate a matching degree to which a suspect product image matches each of the retrieved logo patterns.

Selection unit 403 is configured to select the logo pattern with the greatest matching degree based on the calculated matching degrees for each of the retrieved logo patterns and transmit data including the suspect product image to a detection unit 404 when the matching degree of the selected logo pattern is greater than the first preset threshold.

Detection unit 404 is configured to detect that the suspect product image includes one or more logo patterns.

In some embodiments, the acquisition unit 401 is further configured to acquire logo patterns in a category of the product to be identified from the pre-built logo pattern library.

Figure 7:
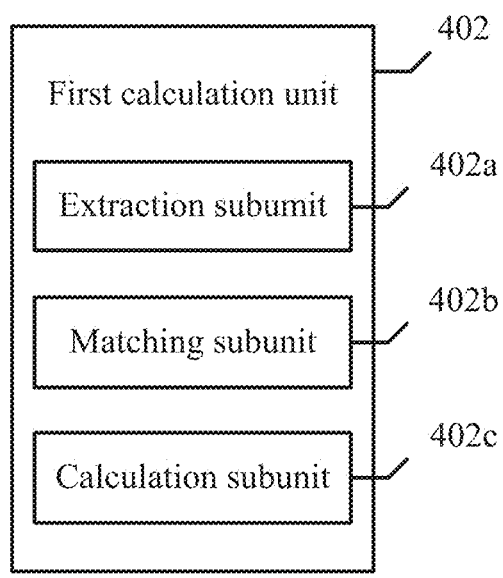
FIG. 7 is a structural diagram of a first calculation unit in a suspected infringing product image detection device according to some embodiments of the present disclosure.

In some embodiments illustrated in FIG. 7, the first calculation unit 402 includes the following subunits.

Extraction subunit 402a is configured to extract local feature points of each logo pattern and the suspect product image.

Matching subunit 402b is configured to search for the local feature points, from local feature points of the suspect product image, that satisfy a preset matching degree with local feature points of each logo pattern with respect to each local feature point of each logo pattern.

Calculation subunit 402c is configured to calculate a ratio of the total number of local feature points that satisfy preset matching conditions to the local feature points of the logo pattern with respect to each logo pattern. The ratio is taken as the matching degree of the logo pattern with the suspect product image.

Figure 8:
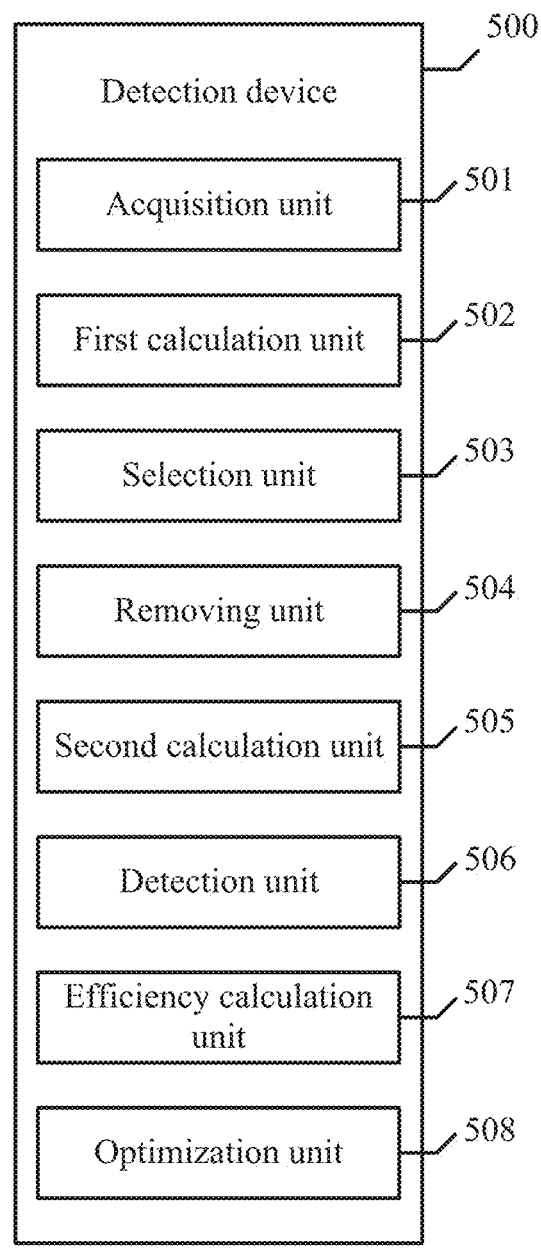
FIG. 8 is a structural diagram of a suspected infringing product image detection device according to some embodiments of the present disclosure.

FIG. 8 is a structural diagram of a suspected infringing product image detection device according to some embodiments of the present disclosure. As shown in FIG. 8, the detection device 500 includes the following units.

Acquisition unit 501 is configured to acquire logo patterns from a pre-built logo pattern library, wherein the logo patterns are images generated based on logo patterns present in infringing product images.

First calculation unit 502 is configured to calculate a matching degree of each acquired logo pattern with respect to a suspect product image, in order to obtain the matching degree between the suspect product image and each logo pattern.

Selection unit 503 is configured to select the logo pattern with the greatest matching degree based on the calculated matching degrees for each logo pattern.

Removing unit 504 is configured to remove any mismatched local feature points from the selected and matched local feature points of the logo pattern and the suspect product image to obtain a set of effective local feature points.

Second calculation unit 505 is configured to calculate a ratio of the total number of effective local feature points to the total number of local feature points of the selected logo pattern. The ratio is the effective matching degree of the selected logo pattern with respect to the suspect product image. The second calculation unit 505 also configured to transmit data including the suspect product image to a detection unit when the effective matching degree is greater than a second preset threshold.

Detection unit 506 is configured to detect whether the suspect product image includes one or more logo patterns.

Figure 9:
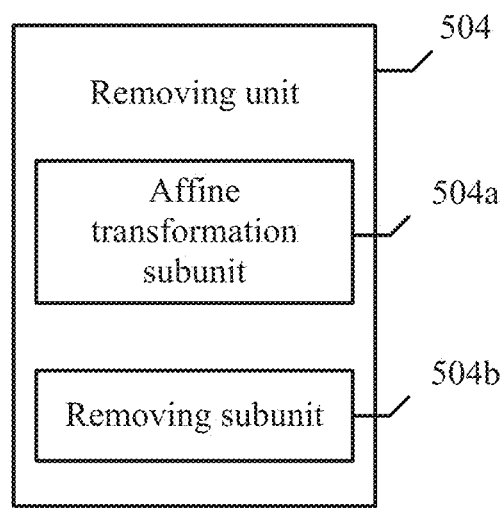
FIG. 9 is a structural diagram of a removing unit in a suspected infringing product image detection device according to some embodiments of the present disclosure.

In some embodiments, the removing unit 504 includes the following subunits illustrated in FIG. 9.

Affine transformation subunit 504a configured to estimate the affine transformation relations between the selected logo pattern and the suspect product image by a random sample consensus algorithm.

Removing subunit 504b configured to remove the local feature points not conforming to the affine transformation relations from the local feature points of the selected and matched logo pattern and the suspect product image, and taking the remaining local feature points as the effective local feature points.

In some embodiments, the detection device may further include the following.

Efficiency calculation unit 507 configured to calculate the efficiency of logo patterns in the logo pattern library according to the auditing results returned from the manual auditing system. The efficiency is used for characterizing the accuracy of the suspected infringing product image detection based on the logo pattern.

Optimization unit 508 is configured to remove a logo pattern from the logo pattern library when the efficiency of the logo pattern is less than an efficiency threshold.

Figure 10:
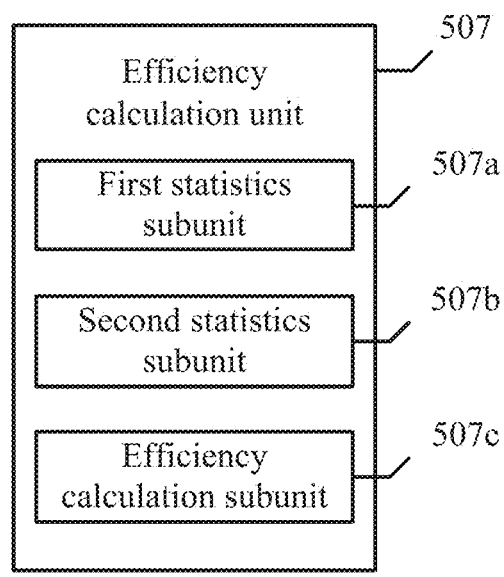
FIG. 10 is a structural diagram of an efficiency calculation unit in a suspected infringing product image detection device according to some embodiments of the present disclosure.

In some embodiments illustrated in FIG. 10, the efficiency calculation unit 507 may include the following subunits.

First statistics subunit 507a is configured to calculate statistics on a total number M of suspected infringing product images detected based on a logo pattern within a preset time period.

Second statistics subunit 507b is configured to calculate statistics on a total number N of images with accurate auditing results among suspected infringing product images detected based on the logo pattern according to the auditing results returned from the manual auditing system.

Efficiency calculation subunit 507c is configured to calculate a ratio of the total number N to the total number M, the ratio representing the efficiency of the logo pattern.

According to the above embodiments, the detection devices and methods herein referencing the "logo pattern" take advantage of the fact they are difficult to evade and are less affected by the shooting angle and lighting. By using a matching degree between a logo pattern and a suspect product image to detect whether it is a suspected infringing product image, the detection method can achieve improved robustness, making detection more comprehensive and accurate. As a result, the amount of recalled imagery can be controlled effectively and the cost of manual review can also be reduced.

Those skilled in the art will also understand that, by combining various illustrative logical blocks, modules, circuits and algorithm steps described herein, embodiments of the present disclosure in electronic hardware, computer software, or their combination can be realized. To clearly illustrate the interchangeability of hardware and software, general description in terms of the functions of various schematic components, units, modules, circuit and steps have been made. Whether this function is realized as software or hardware depends on specific application and the design constraint to the entire system. A person skilled in the art can also realize the above-mentioned function with respect to a specific application in various methods, and this implementation decision shall not be interpreted as departing from the scope of the present disclosure.

Though illustrative embodiments of the present disclosure are shown in the above embodiments, it should be noted that multiple changes and modifications can be made without departing from the scope of the present disclosure. For example, there is no particular execution sequence for functions, procedures and/or actions described in the claims and embodiments herein except that which is required for consistency. In addition, though the elements of the present disclosure can be described and required individually, multiple elements can also be envisioned where a single element is not particularly specified.

Although the above reference drawings describe various embodiments of the present disclosure, a person skilled in the art will appreciate that embodiments of the present disclosure can be further modified without deviating from the scope of the present disclosure.

Professionals in the art should also understand that the disclosure can be embodied in the form of electronic hardware, computer software, or the combination thereof, by combining various example units and algorithm steps described in embodiments disclosed herein. To clearly illustrate the interchangeability of hardware and software, the components and steps of each example have been generally described in terms of function in the above descriptions. Whether this function is implemented as software or hardware depends on specific application of the technical scheme and design constraints. A person skilled in the art can also realize the described function in various methods in terms of specific application, and such realization shall not be interpreted as departing from the scope of the disclosure.

Embodiments can be implemented in the form of hardware, software modules executed by a processor, or a combination of the two, with the combination of the methods or algorithm steps described in embodiments disclosed herein. The software module can be implemented in random access memory (RAM), internal storage, read-only memory (ROM), electrically programmable ROM, electrically erasable programmable ROM, register, hard disk, removable disk, CD-ROM or any other known storage medium in the technical field.

The above specific embodiments have provided more detailed descriptions with respect to the objectives, technical schemes and beneficial effects of the present disclosure. It should be understood that the above are only for illustrating embodiments of the present disclosure, which are not intended to limit the scope of the present disclosure. All alterations, equivalent replacements and improvements, without departing from the spirit and principle of the disclosure, shall fall within the protection scope of the present disclosure.

What is claimed is:

1. A method for determining whether a product image includes a logo pattern, the method comprising:
   retrieving, by a server, one or more logo patterns from a logo pattern library, each of the one or more logo patterns identifying a respective product brand;
   retrieving, by the server, a product image;
   calculating, by the server, for each of the one or more logo patterns, a matching degree, the matching degree representing a degree to which each logo pattern is present in the product image, the calculating comprising:
      identifying an overlapping set of third feature points between first local feature points of the product image and second local feature points of the one or more logo patterns that satisfy a preset matching degree,
      calculating for each of the one or more logo patterns, a ratio of the number of third local feature points to the number of second local feature points,
      identifying effective local feature points for each of the one or more logo patterns by removing one or more mismatched first local feature points from the overlapping feature points, and
      calculating the matching degree for each of the one or more logo patterns by calculating a ratio of the number of the effective local feature points for a given logo pattern to the number of third local feature points identified for the given logo pattern;
   selecting, by the server, as a selected logo pattern, the logo pattern having the greatest calculated matching degree; and
   determining, by the server, that the product image includes the selected logo pattern if the matching degree of the selected logo pattern is greater than a first threshold.

2. The method according to claim 1, the retrieving one or more logo patterns from a logo pattern library further comprising:
   associating, by the server, each of the one or more logo patterns with a category;

identifying, by the server, a category associated with the product image;
retrieving, by the server, one or more logo patterns from the logo pattern library, the retrieved one or more logo patterns each associated with the category associated with the product image.

3. The method according to claim 1, the removing one or more mismatched first local feature points from the third local feature points identified for the selected logo pattern comprising:
estimating, by the server, one or more affine transformation relations between the selected logo pattern and the product image using a random sample consensus algorithm; and
removing, by the server, one or more third local feature points identified for the selected logo pattern that do not conform to the one or more affine transformation relations.

4. The method according to claim 1, the local feature points comprising feature points selected from the group consisting of: scale invariant feature transform feature points, speeded up robust features feature points, affine SIFT feature points, and histogram of oriented gradients feature points.

5. The method according to claim 1, further comprising:
calculating, by the server, an efficiency of one or more logo patterns in the logo pattern library based on auditing results associated with the one or more logo patterns, the auditing results are generated by an auditing system, and the efficiency of one or more logo patterns in the logo pattern library is used for characterizing an accuracy of a determination that the product image includes the selected logo pattern; and
removing, by the server, a logo pattern from the logo pattern library if the calculated efficiency of the logo pattern is less than an efficiency threshold.

6. The method according to claim 5, the calculating the efficiency of one or more logo patterns in the logo pattern library comprising:
calculating, by the server, for each of the one or more logo patterns, a first total number of product images, the first total number of product images representing the number of product images determined to include a logo pattern within a preset time period;
calculating, by the server, for each of the one or more logo patterns, a second total number of product images, the second total number of product images representing the number of product images determined to include a logo pattern within a preset time period having accurate auditing results; and
calculating, by the server, for each of the one or more logo patterns, the efficiency of a logo pattern by calculating a ratio of the second total number of product images to the first total number of product images.

7. A device for determining whether a product image includes a logo pattern, comprising:
a processor; and
a storage medium for tangibly storing thereon program logic for execution by the processor, the stored program logic comprising:
logic executed by the processor for retrieving a product image and one or more logo patterns from a logo pattern library, each of the one or more logo patterns identifying a respective product brand;
logic executed by the processor for calculating, for each of the one or more logo patterns, a matching degree, the matching degree representing a degree to which each logo pattern is present in the product image, the calculating comprising:
identifying an overlapping set of third feature points between first local feature points of the product image and second local feature points of the one or more logo patterns that satisfy a preset matching degree,
calculating for each of the one or more logo patterns, a ratio of the number of third local feature points to the number of second local feature points,
identifying effective local feature points for each of the one or more logo patterns by removing one or more mismatched first local feature points from the overlapping feature points, and
calculating the matching degree for each of the one or more logo patterns by calculating a ratio of the number of the effective local feature points for a given logo pattern to the number of third local feature points identified for the given logo pattern;
logic executed by the processor for selecting, as a selected logo pattern, the logo pattern having the greatest calculated matching degree; and
logic executed by the processor for determining that the product image includes the selected logo pattern if the matching degree of the selected logo pattern is greater than a first threshold.

8. The device according to claim 7 the logic for retrieving a product image and one or more logo patterns from a logo pattern library comprising logic executed by the processor for associating each of the one or more logo patterns with a category, identifying a category associated with the product image and retrieving one or more logo patterns from the logo pattern library, the retrieved one or more logo patterns each associated with the category associated with the product image.

9. The device according to claim 7, the logic for identifying effective local feature points for the selected logo pattern comprising:
logic executed by the processor for estimating one or more affine transformation relations between the selected logo pattern and the product image using a random sample consensus algorithm; and
logic executed by the processor for removing, one or more third local feature points identified for the selected logo pattern that do not conform to the one or more affine transformation relations.

10. The device according to claim 7, the stored program logic further comprising:
logic executed by the processor for calculating an efficiency of one or more logo patterns in the logo pattern library based on auditing results associated with the one or more logo patterns, the auditing results generated by an auditing system, and the efficiency of one or more logo patterns in the logo pattern library used for characterizing an accuracy of a determination that the product image includes the selected logo pattern; and
logic executed by the processor for removing a logo pattern from the logo pattern library if the calculated efficiency of the logo pattern is less than an efficiency threshold.

11. The device according to claim 10, the logic for calculating the efficiency of one or more logo patterns in the logo pattern library comprising:
logic executed by the processor for calculating, for each of the one or more logo patterns, a first total number of product images, the first total number of product images representing the number of product images determined to include a logo pattern within a preset time period;

logic executed by the processor for calculating, for each of the one or more logo patterns, a second total number of product images, the second total number of product images representing the number of product images determined to include a logo pattern within a preset time period having accurate auditing results; and logic executed by the processor for calculating, for each of the one or more logo patterns, the efficiency of a logo pattern by calculating a ratio of the second total number of product images to the first total number of product images.

12. A non-transitory computer readable storage medium tangibly storing computer program instructions capable of being executed by a computer processor, the computer program instructions defining the steps of retrieving, by the processor, one or more logo patterns from a logo pattern library, each of the one or more logo patterns identifying a respective product brand;

retrieving, by the processor, a product image;

calculating, by the processor, for each of the one or more logo patterns, a matching degree, the matching degree representing a degree to which each logo pattern is present in the product image, the calculating comprising:

identifying an overlapping set of third feature points between first local feature points of the product image and second local feature points of the one or more logo patterns that satisfy a preset matching degree, calculating for each of the one or more logo patterns, a ratio of the number of third local feature points to the number of second local feature points, identifying effective local feature points for each of the one or more logo patterns by removing one or more mismatched first local feature points from the overlapping feature points, and calculating the matching degree for each of the one or more logo patterns by calculating a ratio of the number of the effective local feature points for a given logo pattern to the number of third local feature points identified for the given logo pattern;

selecting, by the processor, as a selected logo pattern, the logo pattern having the greatest calculated matching degree; and determining, by the processor, that the product image includes the selected logo pattern if the matching degree of the selected logo pattern is greater than a first threshold.

13. The non-transitory computer-readable storage medium according to claim 12, the computer program instructions defining the step of retrieving one or more logo patterns from a logo pattern library further comprising computer program instructions defining the steps of:

associating, by the processor, each of the one or more logo patterns with a category;

identifying, by the processor, a category associated with the product image;

retrieving, by the processor, one or more logo patterns from the logo pattern library, the retrieved one or more logo patterns each associated with the category associated with the product image.

14. The non-transitory computer-readable storage medium according to claim 12, further comprising computer program instructions defining the steps of:

calculating, by the processor, an efficiency of one or more logo patterns in the logo pattern library based on auditing results associated with the one or more logo patterns, the auditing results generated by an auditing system, and the efficiency of one or more logo patterns in the logo pattern library used for characterizing an accuracy of a determination that the product image includes the selected logo pattern; and removing, by the processor, a logo pattern from the logo pattern library if the calculated efficiency of the logo pattern is less than an efficiency threshold.

* * * * *